(12) United States Patent
Wilson et al.

(10) Patent No.: US 11,981,002 B2
(45) Date of Patent: May 14, 2024

(54) PARKING PAWL SPRING PRE-TENSIONING AND ASSEMBLY TOOL SYSTEM AND METHOD

(71) Applicant: Ford Motor Company, Dearborn, MI (US)

(72) Inventors: Brandon Paul Wilson, Allen Park, MI (US); Zachary Alan Westhoff, Pinckney, MI (US); Edward Lee Hollingsworth, Sr., Canton, MI (US); David Eastman, Farmington Hills, MI (US); Thomas Edward Krol, Brighton, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 17/963,523

(22) Filed: Oct. 11, 2022

(65) Prior Publication Data
US 2024/0116159 A1   Apr. 11, 2024

(51) Int. Cl.
B25B 27/30 (2006.01)
B25B 27/00 (2006.01)
F16H 57/00 (2012.01)
F16H 63/34 (2006.01)

(52) U.S. Cl.
CPC ......... *B25B 27/30* (2013.01); *B25B 27/0035* (2013.01); *F16H 2057/0062* (2013.01); *F16H 63/3425* (2013.01)

(58) Field of Classification Search
CPC . B25B 27/30; B25B 27/0035; F16H 63/3425; F16H 2057/0062
See application file for complete search history.

(56) References Cited

U.S. PATENT DOCUMENTS

| 8,037,972 | B2* | 10/2011 | Fujita | B60W 30/18109 188/161 |
| 8,387,759 | B2* | 3/2013 | Prix | F16H 63/3416 192/219.5 |
| 8,813,555 | B2 | 8/2014 | Zhang | |
| 10,495,223 | B2* | 12/2019 | Puiu | F16D 63/006 |
| 10,962,113 | B2* | 3/2021 | Kramer | F16D 63/006 |
| 11,148,267 | B2 | 10/2021 | Gruner | |
| 2017/0088111 | A1* | 3/2017 | Kirchner | F16D 63/006 |

FOREIGN PATENT DOCUMENTS

| CN | 101934507 | 1/2011 |
| CN | 105500289 | 7/2017 |

* cited by examiner

*Primary Examiner* — Seahee Hong
(74) *Attorney, Agent, or Firm* — Burris Law, PLLC

(57) ABSTRACT

A tool system for installing a parking pawl includes a tool that includes a base, a plate, and an actuator. The base includes a base surface configured to support a parking pawl in a predetermined position. The plate includes a protrusion that extends upward from a front portion of the plate. A rear portion of the plate is coupled to a front portion of the base. The plate is movable relative to the base between a retention position in which the protrusion is positioned to retain a pawl spring loaded on the parking pawl in a pretensioned state, and a release position in which the protrusion is configured to release the pawl spring. The actuator is operably coupled to the plate such that activation of the actuator moves the plate between the retention position and the release position.

17 Claims, 5 Drawing Sheets

PARKING PAWL SPRING PRE-TENSIONING AND ASSEMBLY TOOL SYSTEM AND METHOD

FIELD

The present disclosure relates to a parking pawl spring pre-tensioning and assembly tool system and method of pre-tensioning a parking pawl spring on a parking pawl and assembling the parking pawl in a driveline component.

BACKGROUND

The statements in this section merely provide background information related to the present disclosure and may not constitute prior art.

Some driveline components, such as a vehicle automatic transmission for example, can have a park assembly that allows the component to be placed into a parking state that locks the driveline component to inhibit movement (e.g., inhibiting rolling of a vehicle). Typically, the park assembly includes a parking pawl that is selectively moved between the parking state, in which it engages teeth in a rotary component, and a released state, in which it releases the rotary component. A pawl spring typically biases the parking pawl into either the parking state or the released state.

Typically, the parking pawl and the pawl spring must be assembled together and the spring must be pre-tensioned, prior to being installed into the transmission case. Typical vehicles have pawl springs with a stiffness (e.g., K-factor) that is low and can be pretensioned by an operator using said operator's fingers to rotate the coil into the pre-tensioned state. However, some applications would benefit from a stiffer pawl spring. A stiffer pawl spring can be difficult for an operator to manipulate by hand. Additionally, manipulating the spring using traditional hand tools may result in the spring being over-stretched when attempting to pretension it, which may lead to degradation of the spring. Furthermore, it can be difficult to install the parking pawl with the pre-tensioned spring into the transmission housing due to the tight spaces therein.

The present disclosure addresses these and other issues with assembling a parking pawl and pawl spring into a driveline component.

SUMMARY

This section provides a general summary of the disclosure and is not a comprehensive disclosure of its full scope or all of its features.

In one form, the teachings of the present disclosure provide a tool system for installing a parking pawl. The tool system includes a tool that includes a base, a plate, and an actuator. The base includes a base surface configured to support a parking pawl in a predetermined position. The plate includes a protrusion that extends upward from a front portion of the plate. A rear portion of the plate is coupled to a front portion of the base. The plate is movable relative to the base between a retention position in which the protrusion is positioned to retain a pawl spring loaded on the parking pawl in a pretensioned state, and a release position in which the protrusion is configured to release the pawl spring. The actuator is operably coupled to the plate such that activation of the actuator moves the plate between the retention position and the release position.

In variations of the tool system, which may be implemented individually or in combination: the actuator includes an articulatable member disposed proximate a rear portion of the base and operably coupled to the plate such that articulation of the articulatable member moves the plate between the retention position and the release position; the tool further includes a handle extending from the rear portion of the base; the handle is configured to be gripped by a hand of an operator and the articulatable member is a lever positioned to be articulatable by said hand while said hand grips the handle; the rear portion of the plate is coupled to the front portion of the base by a hinge such that the plate pivots about the hinge between the retention position and the release position; the actuator comprises a rod and an articulatable member, the rod being coupled to the base and translatable relative to the base in a forward and rearward direction of the base, wherein the articulatable member is configured to engage a rear portion of the rod such that articulation of the articulatable member translates the rod forward or rearward, wherein a front portion of the rod is configured to engage the rear portion of the plate to move the plate between the retention position and the release position; the front portion of the rod includes a ramped surface configured such that forward translation of the rod pushes the rear portion of the plate upward so that the front portion of the plate pivots downward; the tool further comprises an alignment pin that extends from the base below the base surface; the alignment pin has a length configured to engage a housing of a driveline component in which the pawl is received such that the alignment pin bottoms out on the housing when a rotational axis of the pawl is aligned with an aperture of the housing; the base defines a pawl retention cavity open in a forward direction and configured to receive an end of the parking pawl while the parking pawl is supported on the base surface; the front portion of the base defines an arcuate surface open in a forward direction and having a radius configured to receive a coil of the pawl spring; the front portion of the plate defines a slot open through the front portion of the plate; the slot is aligned with and below the arcuate surface of the front portion of the base; the protrusion has a rounded or ramped top surface; the actuator is powered by pneumatic pressure, a hydraulic pressure, or electric power; the tool system further includes a fixture including a pin and a ramp, the pin being configured to be received in an aperture defined by the parking pawl and concentric with coils of the pawl spring loaded on the parking pawl, wherein, when the parking pawl is supported on the base surface of the tool and the pin is received in the aperture, the ramp is positioned relative to the pawl spring loaded on the parking pawl such that the ramp engages and lifts a prong of the pawl spring upon rotating the tool about the pin; the fixture defines a recess and the ramp overhangs the recess, the recess being configured to receive the front portion of the plate.

In another form, the present teachings provide a tool system for installing a parking pawl including a tool. The tool includes a base, a handle, a plate, and a lever. The base includes a base surface configured to support a parking pawl in a predetermined position. The handle extends from a rear portion of the base and configured to be gripped by a hand of a user. The plate includes a protrusion that extends upward from a front portion of the plate. A rear portion of the plate is coupled to a front portion of the base by a hinge such that the plate pivots about the hinge relative to the base between a retention position in which the protrusion is positioned to retain a pawl spring loaded on the parking pawl in a pretensioned state, and a release position in which the protrusion is lowered relative to the retention position to release the pawl spring. The lever is disposed proximate the rear portion of the base and positioned to be articulatable by said hand while said hand grips the handle. The lever is operably coupled to the plate such that articulation of the lever moves the plate between the retention position and the release position.

According to a variation of the tool system, the tool system includes a fixture including a pin and a ramp, the pin being configured to be received in an aperture defined by the parking pawl and concentric with coils of the pawl spring loaded on the parking pawl, wherein, when the parking pawl is supported on the base surface of the tool and the pin is received in the aperture with the pawl spring loaded on the parking pawl, the ramp is positioned relative to the pawl spring such that the ramp engages and lifts a prong of the pawl spring upon rotating the tool about the pin, wherein the fixture defines a recess and the ramp overhangs the recess, the recess being configured to receive the front portion of the plate.

In yet another form, the present disclosure provides a method of installing a parking pawl. The method includes loading pawl spring on the parking pawl in a relaxed state of the pawl spring; placing the parking pawl with the loaded pawl spring in the relaxed state on a base of a tool; inserting a pin of a fixture through an aperture defined by the parking pawl concentric with coils of the pawl spring; rotating the tool about the pin in a first rotational direction until the pawl spring is in a pretensioned state; rotating the tool about the pin in a second rotational direction, opposite the first rotational direction, to engage a prong of the pawl spring with a protrusion on the tool to maintain the pawl spring in the pretensioned state; inserting the tool with the pawl spring loaded on the pawl in the pretensioned state into a driveline component; articulating the protrusion to release the prong from the tool; and removing the tool from the driveline component while leaving the pawl and pawl spring in the driveline component.

According to variations of the method, which may be implemented individually or in combination: rotating the tool about the pin in the first rotational direction causes the prong of the pawl spring to engage a ramp of the fixture until the prong is lifted above the protrusion on the tool; rotating the tool about the pin in the second rotational direction causes the prong of the pawl to ride down the ramp and hook around the protrusion so that the protrusion holds the pawl spring in the pretensioned state; articulating the protrusion to release the prong from the tool includes pressing a lever drivingly coupled to the prong.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

and

Figure 9:
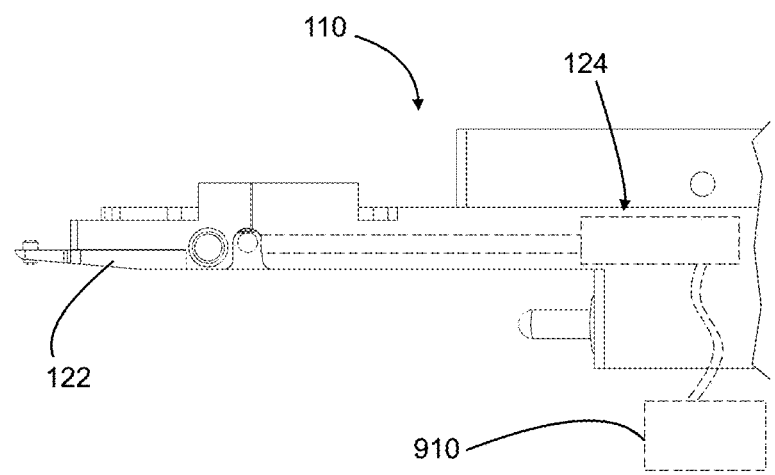

FIG. 9 is a schematic view of a tool of an alternative construction in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
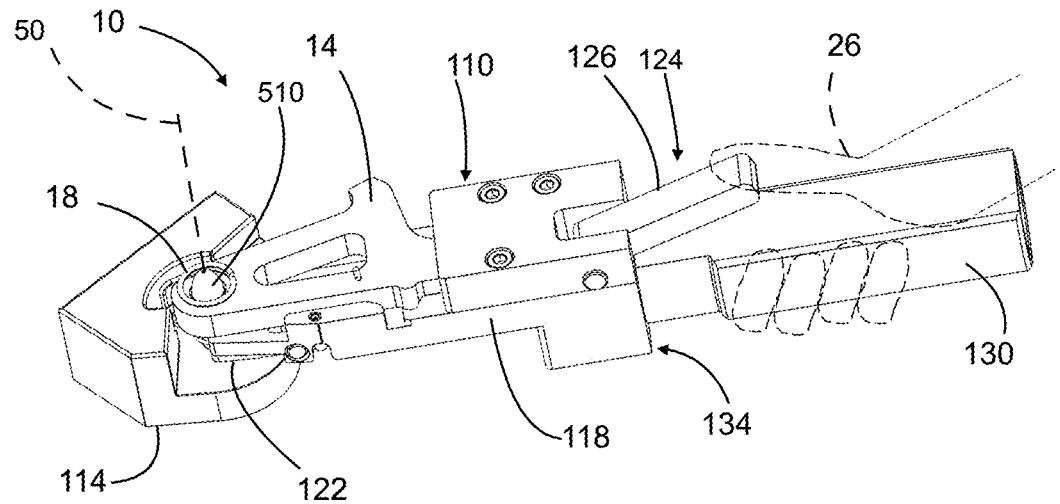
FIG. 1 is a perspective view of a tool system including a tool and a fixture in accordance with the present disclosure, illustrated with a parking pawl and pawl spring loaded on the tool.

Referring to FIG. 1, a tool system 10 for installing a parking pawl 14 with a pawl spring 18 in a driveline component 22 (FIG. 8) is illustrated. The tool system 10 includes a tool 110 and a fixture 114 that are configured to cooperate to pre-tension the pawl spring 18 loaded on the parking pawl 14.

Figure 2:
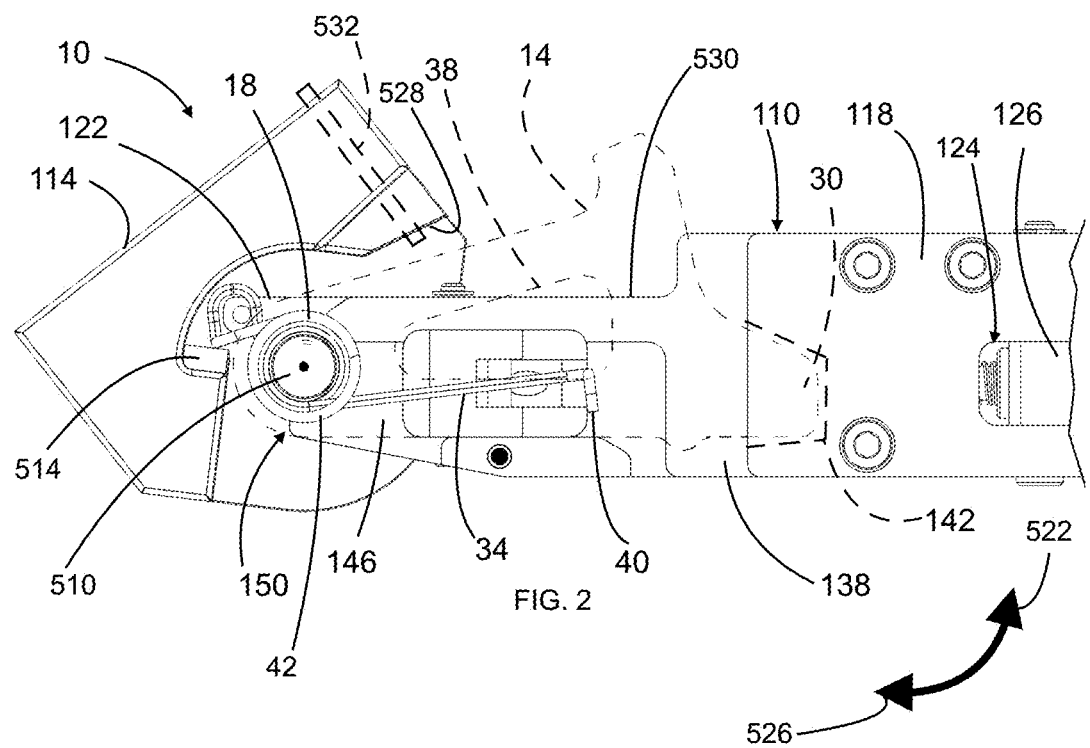
FIG. 2 is a top view of the tool system of FIG. 1.
Figure 3:
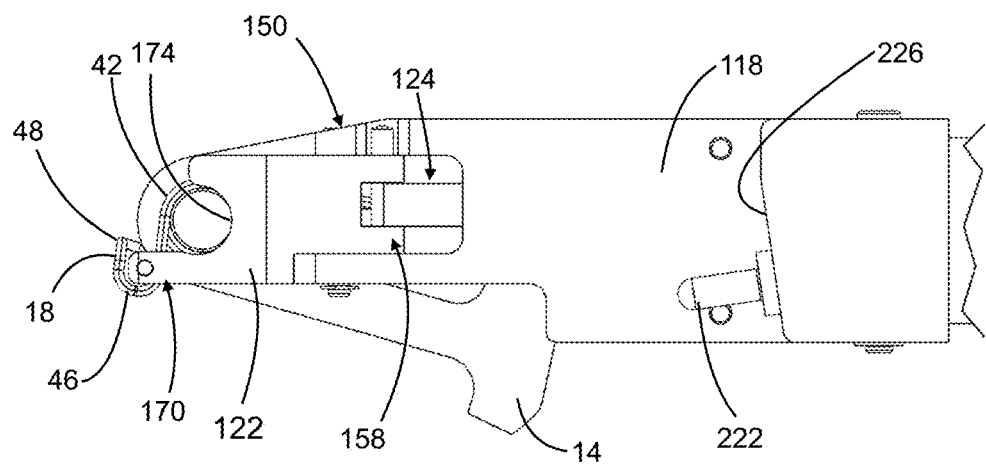
FIG. 3 is a bottom view of the tool of FIG. 1.

Referring to FIGS. 1-3, the tool 110 includes a base 118, a plate 122, and an actuator 124. In the example provided, the actuator 124 includes an articulatable member 126. The articulatable member may be a lever and is also referred to herein as the lever 126, though other types of articulatable members can be used, such as a button, slider, or rotating knob for example. The tool 110 may also include a handle 130.

The handle 130 is configured to be gripped by a hand 26 (shown in dashed lines) of a human operator. The lever 126 is positioned to be within reach of the hand 26 while the hand 26 grips the handle 130 for one-handed operation. In the example provided, the handle 130 extends straight back from a rear portion 134 of the base 118, though other configurations can be used, such as extending downward, or at an angle for example. In the example provided, the lever 126 extends rearward from the rear portion 134 of the base 118 over a top of the handle 130 to be articulated by a thumb of the hand 26, though other configurations can be used, such as extending over a side or bottom of the handle 130 to be articulated by a finger of the hand 26 for example. In one form, not specifically shown, the handle may have a shape or orientation commonly known as a pistol grip and the lever 126 may be as shown or may be oriented as a trigger to be articulated by a finger of the hand 26. While described with reference to a human operator, those of skill in the art will appreciate that a robotic operator may grip the handle 130 and operate the tool 110. In another form, not specifically shown, the handle 130 can be omitted and the base 118 can be attached to a robotic operator, e.g., robotic arm, that can operate the tool 110.

Figure 4:
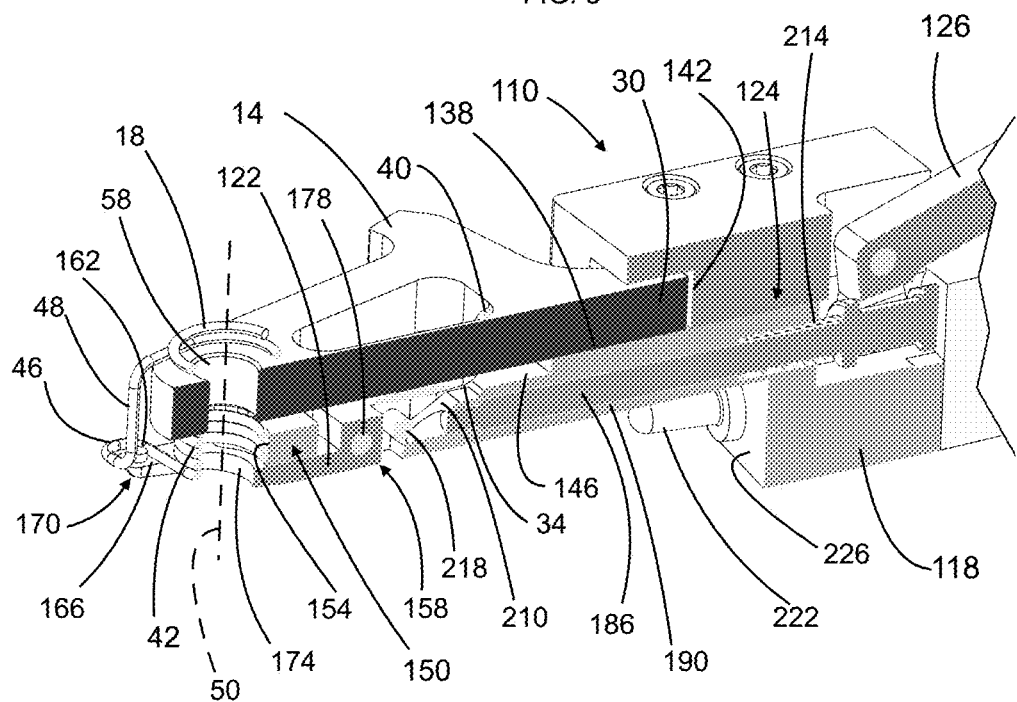
FIG. 4 is a cross-sectional perspective view of the tool of FIG. 1.

Referring to FIGS. 2 and 4, the base 118 includes at least one base surface 138 facing upward and configured to support the parking pawl 14 (shown in FIG. 2 in dashed lines for ease of illustration) on the base 118. The base 118 can define a feature configured to inhibit the parking pawl 14 from moving once supported by the base surface 138, which, in the example provided, can be a retention cavity 142 that is located proximate the rear portion 134 but is open in the forward direction to receive a protrusion 30 of the parking pawl 14. The retention cavity 142 inhibits the parking pawl 14 from moving rearward, laterally, upward, and rotating relative to the base 118, while permitting the pawl 14 to be removed from the retention cavity 142 in the forward direction. The base 118 can also define a channel 146 that is recessed below the base surface 138 and is open through a front portion 150 of the base 118. The channel 146 provides space below the base surface 138 for one prong 34 of the pawl spring 18 to extend below the parking pawl 14 and then upward through an aperture 38 in the parking pawl 14 so that an end 40 of the prong 34 wraps over the top of the parking pawl 14. The front portion 150 of the base 118 can also define an arcuate face 154 having a diameter configured to cradle coils 42 of the pawl spring 18.

Referring to FIGS. 3 and 4, a rear portion 158 of the plate 122 is coupled to the front portion 150 of the base 118. The plate 122 includes a protrusion 162 that extends upward from a top surface 166 of a front portion 170 of the plate 122. The protrusion 162 is forward of the coils 42 and extends upward a distance sufficient to engage a loop 46 of a prong 48 of the pawl spring 18 and retain it in the pre-tensioned state (shown). The plate 122 defines a slot or aperture 174. In the example provided, the aperture 174 is an arcuate shape coaxial with an axis 50 of the coils 42, which is also a rotational axis of the parking pawl 14. The aperture 174 may have a diameter or width that is less than the arcuate face 154 to support the coils 42 on the top surface 166. In the example provided, the aperture 174 is not a complete circle and is open in the forward direction. In an alternative form, not specifically shown, the aperture 174 need not be arcuate in shape and can be squared or any other shape and open toward the front.

The plate 122 is coupled to the base 118 in a manner that permits the plate 122 to move relative to the base 118 between a retention position (shown) and a release position in which the protrusion 162 is lower relative to the retention position. In the release position, the protrusion 162 is sufficiently lowered so that the loop 46 is released, over the protrusion 162, from its pre-tensioned state. The articulatable member (e.g., the lever 126) is drivingly coupled to the plate 122 such that articulation of the articulatable member (e.g., the lever 126) moves the plate between the retention position and the release position.

In the example provided, the rear portion 158 of the plate 122 is coupled to the base 118 by a hinge 178 that permits the plate 122 to pivot about an axis of the hinge 178 between the retention position and the release position. A shaft 186 slidingly extends in the forward and rearward direction through a bore 190 in the base 118. The shaft 186 drivingly couples the lever 126 to the plate 122 so that articulation of the lever 126 moves the plate 122 from the retention position to the release position. In the example provided, the forward end of the shaft 186 includes a ramped surface 210 configured to engage the rear portion 158 of the plate 122 at a location rearward of the hinge 178 to pivot the plate 122 about the hinge 178. In this way, forward movement of the shaft 186 pivots the plate 122 about the hinge 178 from the retention position to the release position. A spring 214 may be included to bias the shaft 186 in the rearward direction. In the example provided, the ramped surface 210 engages a rounded pin 218 on the rear portion 158 of the plate 122, though other configurations can be used.

In another form, schematically shown in FIG. 9, the plate 122 can be moved between the retention position and the release position by another type of actuator 124, such as a pneumatic actuator (e.g., pneumatic or hydraulic piston-cylinder) or electric actuator (e.g., solenoid, worm and rack, screw drive) that can be triggered such as by the lever 126 (shown in FIGS. 1, 2, and 4) or a button (not shown). In other words, the actuator 124 can be a mechanism powered by pneumatic pressure, hydraulic pressure, or electric power from a device 910, such as a pressure source (e.g., a pump) or a power source (e.g., a controller), which may be optionally remotely located. In one form in which the tool 110 is attached to a robotic operator, the robotic operator can directly control the actuator 124 such as by providing a change in pneumatic or hydraulic pressure or by sending electrical signals, for example.

Figure 8:
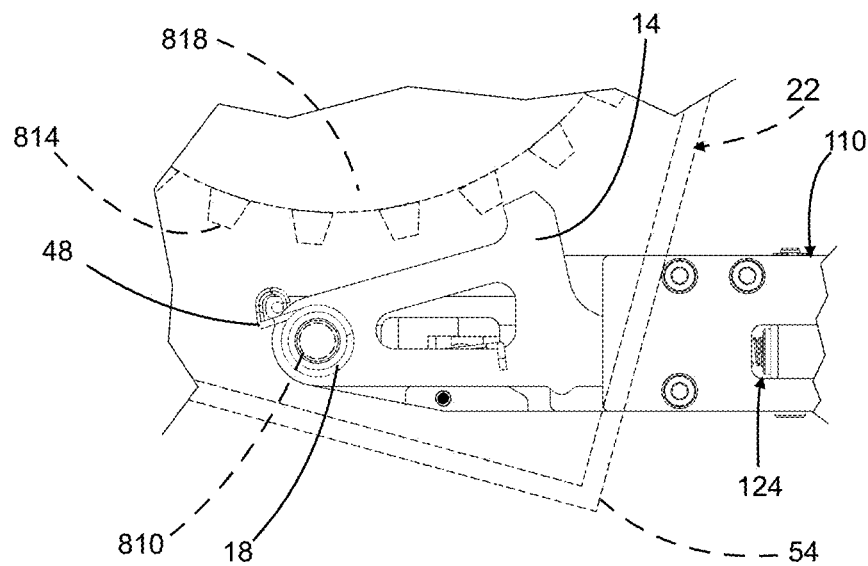
FIG. 8 is a top view of the tool of FIG. 1 in yet another position during the pre-tensioning and installation method of the present disclosure, illustrating the tool inserted in a driveline component for installing the parking pawl and pawl spring therein.

The base 118 may also include an alignment pin 222 that extends from a generally forward facing surface 226 of the base 118. The alignment pin 222 is configured to be received in a mating aperture (not specifically shown) in a housing 54 (FIG. 8) of the driveline component 22 (FIG. 8). The alignment pin 222 can be positioned to ensure that the parking pawl 14 is properly positioned within the housing 54 (FIG. 8), including a proper depth inserted therein so that the rotational axis 50 of the parking pawl 14 is properly aligned. The alignment pin 222 can be an adjustable depth, such as being capable of being screwed in and out relative to the surface 226 for example.

Referring to FIGS. 1 and 2, the fixture 114 includes a pin 510 and a ramp 514. The pin 510 is a diameter that is configured to be received coaxially with the axis 50 through the coils 42 and through a bore 58 (shown in FIG. 4) in the parking pawl 14 that is concentric with the coils 42.

In one form, the fixture 114 may be free and held in the operator's other hand or by another operator, e.g., a robotic operator. In another form, the fixture 114 may be attached to a solid platform, e.g., a workbench or stand.

Figure 5:
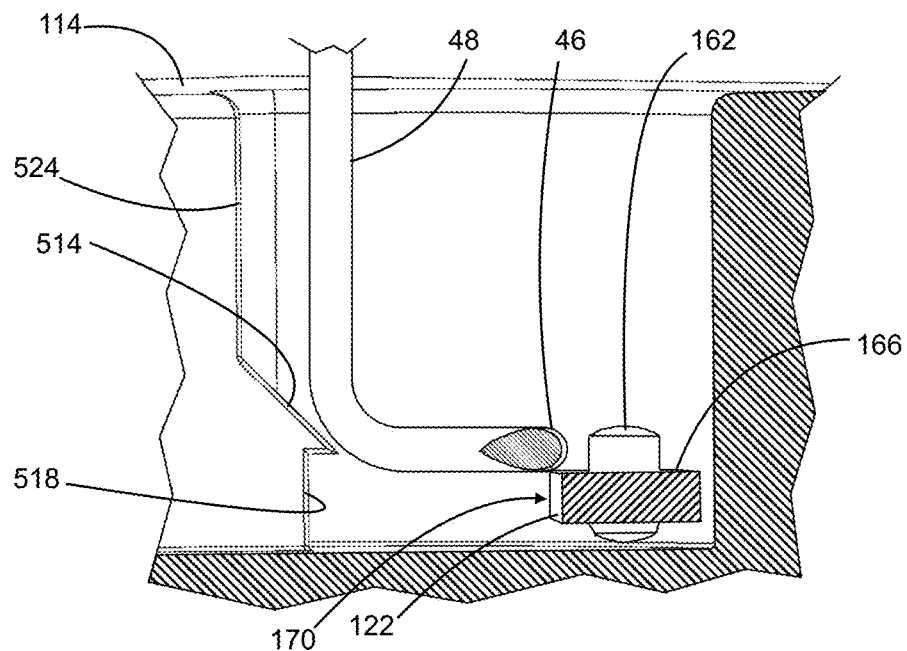
FIG. 5 is a cross-sectional view of the tool system of FIG. 1, illustrated in a first position during a pre-tensioning and installation method in accordance with the present disclosure.

Referring to FIGS. 2 and 5, the ramp 514 is located a distance from the pin 510 such that when the parking pawl 14 and pawl spring 18 are loaded on the tool 110 and the pin 510 is received through the coils 42 and bore 58, the prong 48 proximate the loop 46 is aligned to engage the ramp 514. Referring specifically to FIG. 5, the fixture 114 can define a recess 518 below the ramp 514 and the ramp 514 can overhang the recess 518.

To install the parking pawl 14 and pawl spring 18 in the component, the pawl spring 18 is first loaded onto the parking pawl 14 with the pawl spring 18 in a relaxed state. The prong 34 extends through the aperture 38 in the parking pawl 14 so that the end 40 of the prong 34 wraps over the top of the parking pawl 14. The coils 42 are concentric with the bore 58.

The parking pawl 14 with the pawl spring 18 in the relaxed state is then loaded onto the tool 110, similar to as shown in FIG. 1 but with the prong 48 in the position shown in FIG. 5. As shown in FIG. 5, the loop 46 of the prong 48 is not looped around the protrusion 162 in the relaxed state.

The tool 110 is then positioned on the fixture 114 such that the pin 510 extends through the bore 58 and coils 42, as shown in FIG. 1 but with the prong 48 still in the position shown in FIG. 5.

Figure 6:
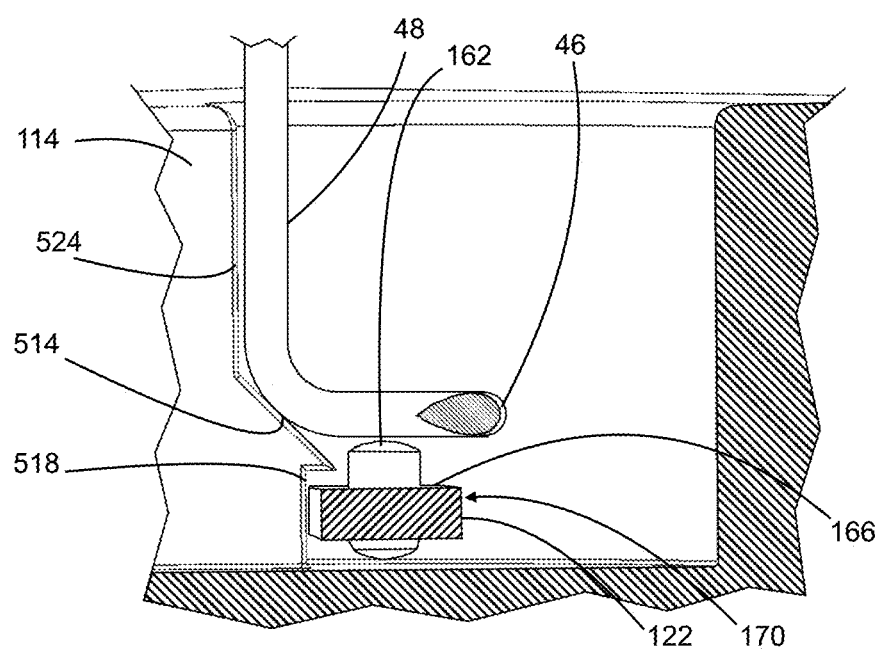
FIG. 6 is a cross-sectional view similar to FIG. 5, illustrating the tool system in a second position during the pre-tensioning and installation method.

From this position, the tool 110 is rotated about the pin 510 in the rotational direction 522 (i.e., counter-clockwise as viewed from the top as shown in FIG. 2) until the front portion 170 of the plate 122 is received in the recess 518 and the prong 48 rides up the ramp 514, as shown in FIG. 6. The ramp 514 is angled such that the prong 48 riding up the ramp 514 lifts the loop 46 above the protrusion 162. The tension of the coils 42 resists rotation in this direction. In one form, the prong 48 may be prevented from riding further up the ramp 514 by a wall 524 of the fixture 114 that extends upward from the top of the ramp 514, thus preventing over-tensioning of the pawl spring 18. Alternatively, or additionally, a sidewall 528 can be positioned to engage a sidewall 530 of the tool 110 to limit the amount of counter-clockwise rotation to prevent over-tensioning. Alternatively, or additionally, a set screw 532 (e.g., a dog-point set screw) can be received in a tapped bore and protrude from the sidewall 528 to provide an adjustable hard stop against the sidewall 530 to prevent over-tensioning. Alternatively, or additionally, a set screw may protrude from the sidewall 530 of the tool 110 to provide a hard stop against the sidewall 528 of the fixture 114.

Thus, the front portion 170 of the plate 122 can be received in the recess 518 such that the protrusion 162 is further counter-clockwise (as shown in FIG. 2; i.e., further to the left as shown in FIG. 6) than the loop 46.

Figure 7:
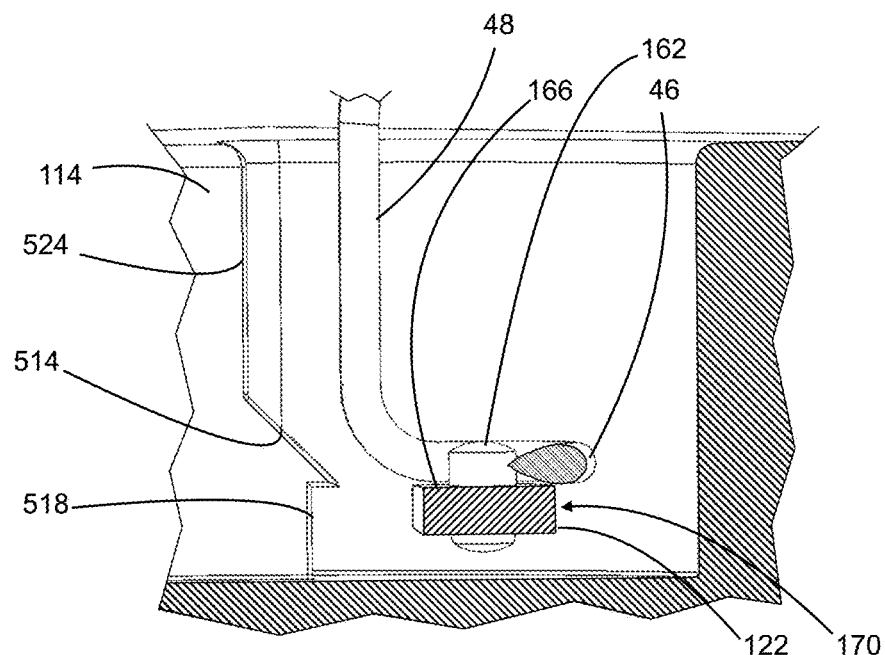
FIG. 7 is a cross-sectional view similar to FIGS. 5 and 6, illustrating the tool system in a third position during the pre-tensioning and installation method.

The tool 110 is then rotated about the pin 510 in the opposite rotational direction 526 (i.e., clockwise as viewed from the top as shown in FIG. 2). As the tool 110 is rotated in the rotational direction 526, the prong 48 rides down the ramp 514, hooking the loop 46 around the protrusion 162 and retaining the pawl spring 18 in the pre-tensioned state, as shown in FIG. 7.

With reference to FIG. 8, the tool 110 is then lifted off of the pin 510 (FIG. 1) and taken to the driveline component 22, where it is inserted into the housing 54. The tool 110 is inserted therein until the bore 58 (FIG. 4) is aligned with a bore 810 in the housing 54. As noted above, the alignment pin 222 (FIG. 4) can assist alignment thereof. A pin (not specifically shown can be inserted into the bore 810 to retain the parking pawl 14 and spring 18 in this aligned position.

The lever 126 is then articulated to move the plate 122 to the release position and release the pawl spring 18 while within the housing 54 such that a feature (not specifically shown; e.g., a pin or protrusion) within the housing 54 can engage the prong 48 so that the pawl spring 18 biases the parking pawl 14 in a predetermined rotational direction (e.g., so that the parking pawl 14 is biased into engagement with teeth 814 of a rotational member 818 of the driveline component 22). As shown in FIGS. 5-7, the top of the protrusion 162 can be rounded to facilitate release of the loop 46.

The tool 110 is then removed from the housing 54 without the parking pawl 14 and pawl spring 18.

Thus, the present disclosure provides a tool system and method for pre-tensioning a parking pawl with a pawl spring and installing the pre-tensioned parking pawl and spring into a driveline component.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tool system for installing a parking pawl, the tool system comprising:
   a tool comprising:
      a base including a base surface configured to support the parking pawl in a predetermined position;
      a plate including a protrusion that extends upward from a front portion of the plate, wherein a rear portion of the plate is coupled to a front portion of the base, the plate being movable relative to the base between a retention position in which the protrusion is positioned to retain a pawl spring loaded on the parking pawl in a pretensioned state, and a release position in which the protrusion is configured to release the pawl spring; and
      an actuator operably coupled to the plate such that activation of the actuator moves the plate between the retention position and the release position.

2. The tool system according to claim 1, wherein the actuator includes an articulatable member disposed proximate a rear portion of the base and operably coupled to the plate such that articulation of the articulatable member moves the plate between the retention position and the release position.

3. The tool system according to claim 2, wherein the tool further includes a handle extending from the rear portion of the base.

4. The tool system according to claim 3, wherein the handle is configured to be gripped by a hand of an operator and the articulatable member is a lever positioned to be articulatable by said hand while said hand grips the handle.

5. The tool system according to claim 1, wherein the rear portion of the plate is coupled to the front portion of the base by a hinge such that the plate pivots about the hinge between the retention position and the release position.

6. The tool system according to claim 5, wherein the actuator comprises a rod and an articulatable member, the rod being coupled to the base and translatable relative to the base in a forward and rearward direction of the base, wherein the articulatable member is configured to engage a rear portion of the rod such that articulation of the articulatable member translates the rod forward or rearward, wherein a front portion of the rod is configured to engage the rear portion of the plate to move the plate between the retention position and the release position.

7. The tool system according to claim 6, wherein the front portion of the rod includes a ramped surface configured such that forward translation of the rod pushes the rear portion of the plate upward so that the front portion of the plate pivots downward.

8. The tool system according to claim 1, wherein the tool further comprises an alignment pin that extends from the base below the base surface.

9. The tool system according to claim 8, wherein the alignment pin has a length configured to engage a housing of a driveline component in which the parking pawl is received such that the alignment pin bottoms out on the housing when a rotational axis of the parking pawl is aligned with an aperture of the housing.

10. The tool system according to claim 1, wherein the base defines a pawl retention cavity open in a forward direction and configured to receive an end of the parking pawl while the parking pawl is supported on the base surface.

11. The tool system according to claim 1, wherein the front portion of the plate defines a slot open through the front portion of the plate.

12. The tool system according to claim 1, wherein the protrusion has a rounded or ramped top surface.

13. The tool system according to claim 1, wherein the actuator is powered by pneumatic pressure, a hydraulic pressure, or electric power.

14. The tool system according to claim 1 further comprising a fixture including a pin and a ramp, the pin being configured to be received in an aperture defined by the parking pawl and concentric with coils of the pawl spring loaded on the parking pawl, wherein, when the parking pawl is supported on the base surface of the tool and the pin is received in the aperture, the ramp is positioned relative to the pawl spring loaded on the parking pawl such that the ramp engages and lifts a prong of the pawl spring upon rotating the tool about the pin.

15. The tool system according to claim 14, wherein the fixture defines a recess and the ramp overhangs the recess, the recess being configured to receive the front portion of the plate.

16. A tool system for installing a parking pawl, the tool system comprising:
   a tool comprising:
      a base including a base surface configured to support the parking pawl in a predetermined position;
      a handle extending from a rear portion of the base and configured to be gripped by a hand of a user;
      a plate including a protrusion that extends upward from a front portion of the plate, wherein a rear portion of the plate is coupled to a front portion of the base by a hinge such that the plate pivots about the hinge relative to the base between a retention position in which the protrusion is positioned to retain a pawl spring loaded on the parking pawl in a pretensioned state, and a release position in which the protrusion is lowered relative to the retention position to release the pawl spring; and
      a lever disposed proximate the rear portion of the base and positioned to be articulatable by said hand while said hand grips the handle, the lever being operably coupled to the plate such that articulation of the lever moves the plate between the retention position and the release position.

17. The tool system according to claim 16 further comprising a fixture including a pin and a ramp, the pin being configured to be received in an aperture defined by the parking pawl and concentric with coils of the pawl spring loaded on the parking pawl, wherein, when the parking pawl is supported on the base surface of the tool and the pin is received in the aperture with the pawl spring loaded on the parking pawl, the ramp is positioned relative to the pawl spring such that the ramp engages and lifts a prong of the pawl spring upon rotating the tool about the pin, wherein the fixture defines a recess and the ramp overhangs the recess, the recess being configured to receive the front portion of the plate.

* * * * *